United States Patent
Odenthal et al.

(10) Patent No.: US 9,356,540 B2
(45) Date of Patent: May 31, 2016

(54) METHOD FOR AUTOMATICALLY CONTROLLING AN ELECTROHYDRAULIC PRESSING TOOL

(75) Inventors: Guenther Odenthal, Moenchengladbach (DE); Joerg Hanisch, Wuppertal (DE); Dennis Jechow, Wuppertal (DE)

(73) Assignee: Novopress GmbH Presen Und Presswerkzeuge & Co. KG, Neuss (DE)

( * ) Notice: Subject to any disclaimer, the term of this patent is extended or adjusted under 35 U.S.C. 154(b) by 250 days.

(21) Appl. No.: 13/985,941

(22) PCT Filed: Feb. 7, 2012

(86) PCT No.: PCT/EP2012/052048
§ 371 (c)(1),
(2), (4) Date: Aug. 16, 2013

(87) PCT Pub. No.: WO2012/110362
PCT Pub. Date: Aug. 23, 2012

(65) Prior Publication Data
US 2013/0328513 A1    Dec. 12, 2013

(30) Foreign Application Priority Data
Feb. 18, 2011 (DE) .......... 10 2011 011 742

(51) Int. Cl.
  *H02P 7/00* (2006.01)
  *H02P 3/02* (2006.01)
  (Continued)

(52) U.S. Cl.
  CPC . *H02P 3/02* (2013.01); *B25B 27/10* (2013.01); *B30B 15/16* (2013.01)

(58) Field of Classification Search
  CPC . Y02T 10/642; Y02T 10/7005; B62D 5/0463
  USPC .................................................. 318/139, 432
  See application file for complete search history.

(56) References Cited

U.S. PATENT DOCUMENTS 3,844,157 A * 10/1974 Bachmann ................... 72/452.9
4,145,845 A *  3/1979 Ebelt .............................. 451/27
(Continued)

FOREIGN PATENT DOCUMENTS

DE   19825160 A1   4/1999
DE   10106360 C1   7/2002
(Continued)

OTHER PUBLICATIONS

International Search Report dated Apr. 17, 2012 for PCT application No. PCT/EP2012/052048.

*Primary Examiner* — Rina Duda
(74) *Attorney, Agent, or Firm* — Ohlandt, Greeley, Ruggiero & Perle, LLP

(57) ABSTRACT

In the case of a method for automatically controlling an electrohydraulic pressing tool, in particular for producing pipe connections, to actuate the pressing tool a hydraulic piston is moved, in that fluid is pumped into a hydraulic cylinder by a hydraulic pump driven by an electric motor. When a limiting pressure in the hydraulic cylinder is reached, a pressure relief valve opens, and so the hydraulic fluid can flow into a reservoir. With the aid of a control device, a current drop at the motor is detected when the valve opens. The electric motor is switched off when the current falls by a predetermined value ($\Delta I$) and/or decreases over a predetermined time period ($\Delta t$) after reaching a limiting current.

7 Claims, 2 Drawing Sheets

(51) Int. Cl.
  *B25B 27/10* (2006.01)
  *B30B 15/16* (2006.01)

(56) References Cited

U.S. PATENT DOCUMENTS

| | | | |
|---|---|---|---|
| 4,790,233 A * | 12/1988 | Backe et al. | 91/361 |
| 5,727,417 A * | 3/1998 | Moffatt et al. | 72/453.03 |
| 6,035,775 A * | 3/2000 | Nghiem | 100/43 |
| 6,415,641 B1 * | 7/2002 | Wagner | 72/393 |
| 7,421,871 B2 * | 9/2008 | Goop | 72/20.1 |

| | | | |
|---|---|---|---|
| 2010/0300308 A1 | 12/2010 | Frenken | |
| 2013/0328513 A1 | 12/2013 | Odenthal et al. | |

FOREIGN PATENT DOCUMENTS

| | | |
|---|---|---|
| DE | 20308966 U1 | 10/2004 |
| DE | 102008024018 A1 | 11/2008 |
| DE | 102011011742 A1 | 8/2012 |
| EP | 0941813 A1 | 9/1999 |
| EP | 1230998 A2 | 8/2002 |
| WO | 9710908 A1 | 3/1997 |

* cited by examiner

METHOD FOR AUTOMATICALLY CONTROLLING AN ELECTROHYDRAULIC PRESSING TOOL

BACKGROUND

1. Field of the Disclosure

The disclosure relates to a method for automatically controlling an electrohydraulic pressing tool, in particular for producing pipe connections.

2. Discussion of the Background Art

For producing pipe connections with the aid of press fittings, it is known to use electrohydraulic pressing tools which are operative to generate a plastic deformation of the press fittings. An electrohydraulic pressing tool used for this purpose comprises a hydraulic piston arranged in a hydraulic cylinder. To actuate the pressing tool, i.e. particularly for closing the pressing jaws, fluid will be pumped from a fluid reservoir into the hydraulic cylinder by means of a hydraulic pump. In the process, the hydraulic pump will be driven by an electric motor. Further, the hydraulic cylinder is connected to a valve such as e.g. an overpressure valve. When a limiting pressure is reached in the hydraulic cylinder, said overpressure valve, which normally is of the mechanic type, will be automatically opened, thus allowing the fluid to flow back into the reservoir. In the subsequent pressing process, the hydraulic piston will be pressed back into the base position, e.g. by means of a spring, thereby also causing the fluid to be conveyed back into the reservoir. After termination of the pressing process, the electric motor has to be switched off. The switch-off of the electric motor can be performed by the user, e.g. by releasing the starter.

For effecting an automatic switch-off of the electric motor, it is known to measure the rotary speed of the electric motor. When the overpressure valve is opened, the pressure in the hydraulic cylinder will drop sharply, thus causing the rotary speed of the motor to increase. This increase of the rotary speed can be detected and be used as switch-off signal for the electric motor. In this context, the measurement of the rotary speed requires an external sensor.

Further, from EP 1 230 998, there is known an automatic method for switch-off of the electric motor, wherein the electric current intake of the electric motor is measured. When the overpressure valve is opened, the current will decrease. With the aid of a microprocessor, a drop below a stored electric current value will be detected and, as soon as this predefined fixed electric current value is not reached anymore, the electric motor will be switched off. This method, however, has the disadvantage that the electric current prevailing at the end of the pressing process, i.e. when opening the overpressure valve, is dependent on external influencing factors. The electric current really prevailing at the end of the pressing process will depend e.g. on the charging state of the rechargeable battery, the condition of the motor (condition of the carbon brushes, inner resistances etc.), the temperature of the hydraulic oil, and on the wear of the mechanics of the whole pressing assembly. This can have the result that the electric current prevailing during the opening of the overpressure valve is relatively high, so that the stored switch-off current value will be reached only after a temporally long current drop. As far as the electric current prevailing during the opening of the overpressure valve is smaller than the switch-off current value, the problem exists that no switch-off will take place.

It is an object of the disclosure to provide a method for automatically controlling an electrohydraulic pressing tool, wherein said method shall have an improved reliability.

SUMMARY

The electrohydraulic pressing tool by means of which the method of the disclosure is carried out, comprises a hydraulic piston for actuating the pressing tool, particularly for actuating pressing jaws. With the aid of the hydraulic piston, the pressing jaws are displaced and pivoted in such a manner that a radial pressing of press fitting can be carried out. Of course, the method of the disclosure is applicable also in other pressing tools which are suited e.g. for the pressing of cable shoes and the like. The hydraulic piston is arranged in a hydraulic cylinder, and, for displacing the piston, a fluid will be pumped with the aid of a hydraulic pump driven by an electric motor. Further, the hydraulic cylinder comprises a valve, such as e.g. an overpressure valve, which will open as soon as a limiting pressure has been reached, i.e. when the required pressing force has been reached. In case that an overpressure valve is provided, the opening of the valve will occur as a result of the pressure prevailing in the cylinder. Thus, for actuating the pressing tool, the hydraulic piston will be moved in the hydraulic cylinder by supply of hydraulic fluid, effected with the aid of an electrically driven hydraulic pump. Then, when the limiting pressure has been reached, the valve arranged in the hydraulic cylinder will open, so that the fluid can flow back into a reservoir and, at the same time, the hydraulic piston can be pushed and respectively pulled back. This return movement of the piston can be performed mechanically by a spring.

For switching off the electric motor when the limiting pressure has been reached, in order to thus preventing a further conveyance of fluid into the hydraulic cylinder, it is according to the disclosure provided that a voltage drop is detected upon opening of the valve. However, the electric motor will not be switched off due to a mere voltage drop but only when the current decreases by a predetermined value. Further, it can be provided that the electric motor will be switched off only if the decrease of the current has occurred for a predetermined period of time, it is also being possible to combine these two preconditions.

Thus, according to the disclosure, the detecting of the opening of the valve will be caused by a change of the current, irrespective of absolute values. This has the advantage—essential of the disclosure—that, for the switch-off of the electric motor, it is irrelevant at which maximum current the valve will open and respectively be opened. The switch-off of the electric motor is thus independent from the condition of the hydraulic fluid, the degree of wear of the mechanics etc. This is of importance especially because the switch-off of the electric motor will be performed after a predetermined change of the current and/or a predetermined period of time. Thus, after the valve has been opened, the current does not need to drop to a lower limiting value such as e.g. a stopping current. Instead, a drop of the current by a predetermined value or a drop of the current for a predetermined length of time will be sufficient. As a result, after the valve has been opened, the electric motor will always be switched off according to a clearly defined rule and, consequently, the conveyance of fluid into the hydraulic cylinder with the aid of the electric motor, as occurring upon opening of the valve, will be reduced to a quantity as small as possible.

Due to the inventive linking of the detected current drop to a change of the current by a predetermined value and/or a drop of the current for a predetermined length of time, it is further avoided that the electric motor could be switched off in case of short-term minor current drops which may possibly occur during the pressing process. Such short-term current drops may be caused e.g. by changes of the frictional relationships during the pressing process.

Said predetermined current value which preferably is stored in a microprocessor, can be an absolute value. It is preferred to detect this value as a percentage of the current applied immediately prior to the opening of the valve. Preferably, the value of the current is a percentage of the maximum current which can prevail during the pressing process. Preferably, herein, the peak current occurring directly after the switch-on of the pressing tool should be left unconsidered. The determining of the predefined value of the current as a percentage of a maximum value has the advantage that, in different pressing processes, there will occur different maximum currents and, thus, the switch-off of the electric motor will always be adjusted to the specific pressing process. Preferably, said percentage is in the range of 2 to 20%, preferably 2 to 10% and most preferably 2 to 5%.

Also said predetermined period of time can be a percentage of the whole pressing process. This percentage is preferably in the range of 2 to 20%, preferably 2 to 10% and most preferably 2 to 5%.

According to a preferred embodiment of the disclosure, the change of the electric current is detected directly by a control device controlling the electric motor, said control device preferably comprising a circuit board and/or a microprocessor.

According to a preferred embodiment of the inventive method, which represents an independent disclosure, the pressing process will be completely terminated in an automatic manner. For this purpose, it is—according to the disclosure—provided that, after the pressing tool has been actuated, i.e. after switch-off of the electric motor, a minimum current will be detected. This minimum current appears after a high switch-on current has occurred for a short time immediately subsequent to the switch-on of the electric motor. On the basis of the detected minimum current, a starting current will be determined. Then, after said starting current has been reached, there is performed an automatic complete termination of the pressing process. This means that, once the starting current has been reached, an actuating switch can be released by the user and the pressing process will nonetheless not be interrupted. After the starting current has been reached, an interruption of the pressing process will be possible only by actuating a relief switch.

The starting current can be larger than the minimum current by a predetermined fixed value which preferably has been stored in the electronics of the electric motor. It is preferred, however, that the starting current is not larger than the minimum current by a fixed predetermined value but, instead, is higher than the minimum current by a predetermined percentage. This percentage is, with preference, 2 to 20%, preferably 2 to 10% and most preferably 2 to 5%.

As soon as the pressing process has thus been started, the start key can be released by the user without thereby causing the pressing process to be interrupted. This has the advantage, for instance, that the user cannot release the start key briefly before termination of the pressing process and thereby prematurely interrupt the pressing process. Interruption of the pressing process is thus possible only by actuation of a relief switch. Since this is a well-intended interruption of the pressing process, the user will be made aware that no correct pressing has been performed. Said relief switch comprises e.g. a manual unlocking valve, or it will control the valve arranged in the hydraulic cylinder.

Of particular preference is the combination of the two above described methods since this will allow for an extremely reliable automatic control of an electrohydraulic pressing tool.

Instead of detecting values of an electric current as well as changes of an electric current, it is also possible to perform the above described methods of the disclosure on the basis of voltage values and voltage changes.

The disclosure will be described in greater detail hereunder by way of a preferred embodiment with reference to the accompanying drawings.

DETAILED DESCRIPTION OF THE PREFERRED EMBODIMENT

Figure 1:
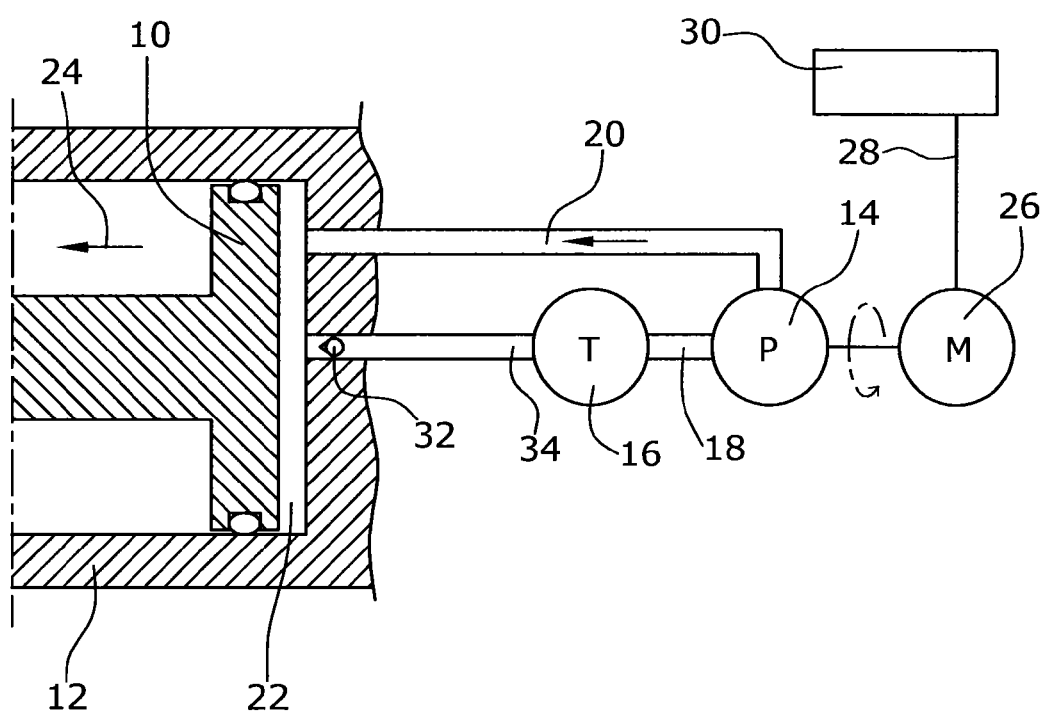
FIG. 1 is a schematic sectional view of an electrohydraulic pressing tool for performing the method of the disclosure.

A pressing tool comprises a hydraulic piston 10 arranged in a cylinder 12. Hydraulic piston 10 is connected to press jaws or other tools, not illustrated, of the pressing tool. With the aid of a hydraulic pump 14, a hydraulic fluid is supplied, via conduits 18, 20, from a reservoir 16 to a piston chamber 22. Thereby, the piston 10 is moved in the direction indicated by arrow 24 for actuating the pressing tool.

Said hydraulic pump 14 is driven by an electric motor 26 which, via an electric line 28, is connected to a control device 30.

When a limiting pressure is reached in piston chamber 22, an overpressure valve 32, which in the illustrated embodiment is of a mechanical type, will open. Thereby, the hydraulic fluid can flow back from piston chamber 22 into reservoir 16 via a conduit 34. By means of a spring, not illustrated, the hydraulic piston 10 will be mechanically pushed back into its base position.

Immediately after the overpressure valve 32 has opened, the electric motor 26 will be switched off with the aid of the method of the disclosure.

Figure 2:
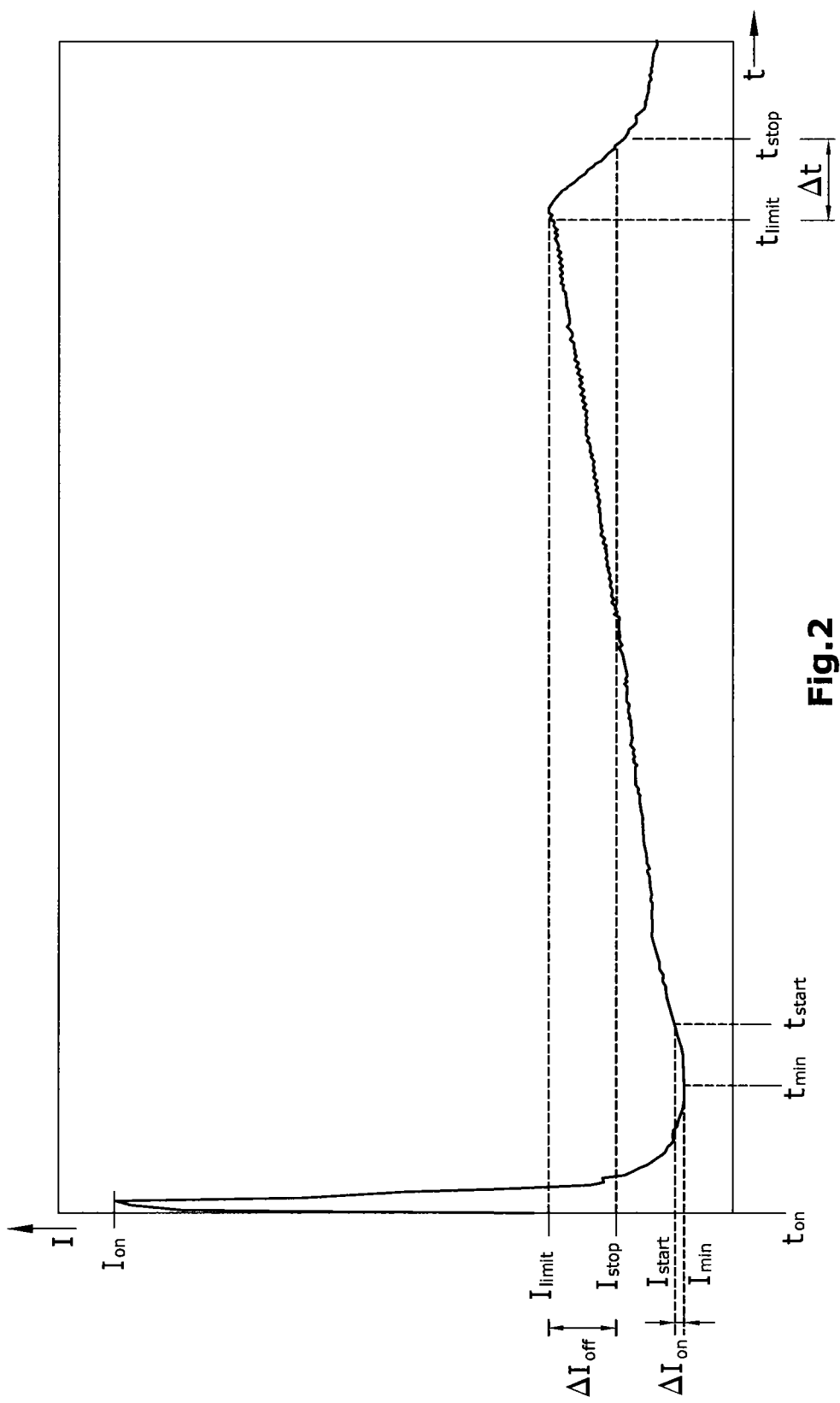
FIG. 2 is a diagram representing the electric current over time during a pressing process.

From the diagram shown in FIG. 2, representing the electric current over time, it is evident that, at a time $t_{on}$, a starting switch of the pressing tool is actuated. This leads to a short-term massive increase of the current to a value $I_{on}$. Immediately after the pressing tool has been switched on, the switch-on current $I_{on}$ will drop again, so that, at a time $t_{start}$, the pressing process can be detected, by the control device 30, as having been started. In said preferred embodiment of the inventive control method that represents an independent disclosure, this detection will have the effect that, even when the starting switch is released by the user, the pressing process will not be interrupted anymore until the limiting pressure has been reached and the overpressure valve will open. According to a particularly preferred embodiment, there will be determined—in this process—not points of time but electric currents. Particularly, after the motor has been switched on, the minimum current $I_{min}$ will be detected. On the basis of the minimum current $I_{min}$, a starting current $I_{start}$ will be determined. This is preferably performed by a computation in the control device. Preferably, the starting current $I_{start}$ is determined in that the minimum current $I_{min}$ is increased by a predefined percentage. The starting current $I_{start}$ is e.g. 110% of the minimum current $I_{min}$. As soon as the pressing process has caused an increase of the load, there will occur a substantially continuous increase of the current up to a value $I_{limit}$. The limiting current $I_{limit}$ corresponds to the limiting pressure at which the overpressure valve 32 will open. The opening of overpressure valve 32 will directly effect a voltage drop, starting at the time $t_{limit}$. This voltage drop at the electric motor 26 is detected by the control device 30. In case of a change of the current by a predetermined value $\Delta I$, the electric motor will be switched off automatically. As a result, the current will not continue to decrease over time, as represented in the diagram, but will directly drop to 0.

Additionally to, or instead of, determining a predefined current value $\Delta I$, there can also be detected, over a time period $\Delta t$, a decrease of the current starting from said limiting current $I_{limit}$ by which a time $t_{limit}$ is defined. This will then lead to switch-off of the electric motor 26 at a time $t_{stop}$, and then, other than in the representation in FIG. 2, will directly cause the current to drop to 0.

Particularly, the two preconditions for switching off the electric motor 26 can be linked to each other. For instance, it can be provided that both preconditions, or only one of the two preconditions, have to be fulfilled in order to perform a switch-off of the motor.

A corresponding control can also be carried out on the basis of the voltage change.

What is claimed is:

1. A method for automatically controlling an electrohydraulic pressing tool, wherein to actuate the pressing tool, a hydraulic piston is moved, so that fluid is pumped into a hydraulic cylinder by a hydraulic pump driven by an electric motor, wherein a valve connected to the hydraulic cylinder is opened when a limiting pressure is reached, wherein a starting current ($I_{start}$) is determined in dependence on a minimum current ($I_{min}$) detected after the switch-on of the electric motor, and wherein the pressing process is automatically completely terminated when said starting current ($I_{start}$) has been reached.

2. The method according to claim 1, wherein the starting current ($I_{start}$) is higher than the minimum current ($I_{min}$) by a predetermined percentage.

3. The method according to claim 1, wherein the pressing process is interrupted only by actuation of a relief switch.

4. The method according to claim 1, wherein, after termination of the pressing process, the electric motor is switched off when the current falls by a predetermined value ($\Delta I$) and/or decreases over a predetermined time period ($\Delta t$) after reaching a limiting current ($I_{limit}$).

5. The method according to claim 2, wherein said percentage is 2 to 20%.

6. The method according to claim 5, wherein said percentage is 2 to 10%.

7. The method according to claim 6, wherein said percentage is 2 to 5%.

* * * * *